United States Patent
Suber

(10) Patent No.: US 8,714,607 B1
(45) Date of Patent: May 6, 2014

(54) HAND SHOVEL ASSEMBLY

(71) Applicant: Lionel A. Suber, Springfield, IL (US)

(72) Inventor: Lionel A. Suber, Springfield, IL (US)

(*) Notice: Subject to any disclaimer, the term of this patent is extended or adjusted under 35 U.S.C. 154(b) by 0 days.

(21) Appl. No.: 13/778,988

(22) Filed: Feb. 27, 2013

(51) Int. Cl.
 *A01B 1/02* (2006.01)

(52) U.S. Cl.
 USPC .................................. 294/50; 294/56; 294/58

(58) Field of Classification Search
 USPC .......... 294/26.5, 49, 50, 50.5, 54.5, 176, 177, 294/178, 56, 57, 58, 59, 181; 15/257.6, 15/257.9; 37/265, 285
 See application file for complete search history.

(56) References Cited

U.S. PATENT DOCUMENTS

| | | | | |
|---|---|---|---|---|
| 490,200 A * | 1/1893 | Hill | ............... | 15/257.6 |
| 803,204 A * | 10/1905 | Widmer | ............... | 15/257.6 |
| 1,178,353 A * | 4/1916 | Schaffner | ............... | 15/257.6 |
| 1,384,076 A * | 7/1921 | McCallan | ............... | 15/257.9 |
| 1,419,987 A * | 6/1922 | Roat | ............... | 294/50 |
| 1,607,765 A * | 11/1926 | Levy | ............... | 425/286 |
| 2,020,293 A * | 11/1935 | Adelstein | ............... | 15/105 |
| 4,302,894 A | 12/1981 | Emma | | |
| 4,767,141 A * | 8/1988 | Martin | ............... | 294/50 |
| 4,858,503 A | 8/1989 | Dike, Jr. | | |
| 5,074,064 A * | 12/1991 | Nickels | ............... | 37/265 |
| 5,133,101 A * | 7/1992 | Hauser et al. | ............... | 15/143.1 |
| D356,482 S | 3/1995 | Jensen, Jr. | | |
| 5,799,996 A * | 9/1998 | Fredrickson | ............... | 294/51 |
| 5,906,145 A | 5/1999 | Shepherd | | |
| 6,116,117 A | 9/2000 | Nicolosi et al. | | |
| 6,162,039 A * | 12/2000 | Schwarz et al. | ............... | 425/282 |
| 6,467,377 B1 | 10/2002 | Kersting | | |
| 6,732,402 B1 * | 5/2004 | Hsu | ............... | 15/257.6 |
| D520,819 S | 5/2006 | Onembo | | |

* cited by examiner

*Primary Examiner* — Dean Kramer

(57) ABSTRACT

A hand shovel assembly facilitates emptying of the shovel with minimal lifting. The assembly includes a shaft having an upper end and a lower end. A pan is coupled to the lower end of the shaft. The pan has a bottom wall, a back wall which extends upwardly from the bottom wall, and a pair of side walls coupled to and extending forwardly from opposite ends of the back wall defining an interior space of the pan. An upper wall is coupled to the pan over the bottom wall. A motivator is coupled to the pan between the bottom wall and the upper wall. The motivator selectively urges the upper wall away from the bottom wall wherein the upper wall is configured to urge material in the interior space of the pan out of the interior space.

20 Claims, 4 Drawing Sheets

HAND SHOVEL ASSEMBLY

BACKGROUND OF THE DISCLOSURE

Field of the Disclosure

The disclosure relates to shovel devices and more particularly pertains to a new shovel device, for facilitating emptying of the shovel with minimal lifting.

SUMMARY OF THE DISCLOSURE

An embodiment of the disclosure meets the needs presented above by generally comprising a shaft having an upper end and a lower end. A pan is coupled to the lower end of the shaft. The pan has a bottom wall, a back wall which extends upwardly from the bottom wall, and a pair of side walls coupled to and extending forwardly from opposite ends of the back wall defining an interior space of the pan. An upper wall is coupled to the pan over the bottom wall. A motivator is coupled to the pan between the bottom wall and the upper wall. The motivator selectively urges the upper wall away from the bottom wall wherein the upper wall is configured to urge material in the interior space of the pan out of the interior space.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
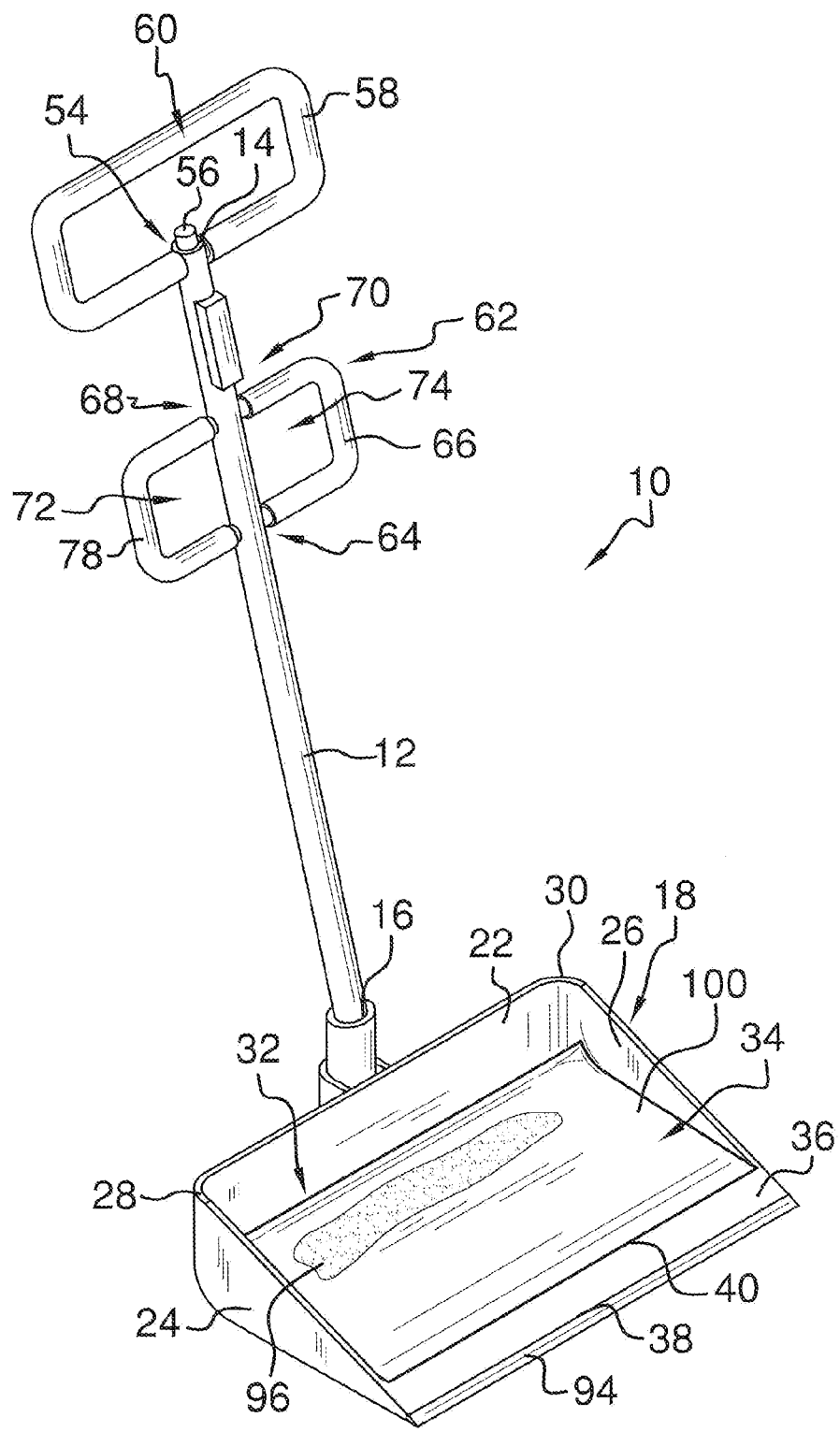
FIG. 1 is a top front side perspective view of a hand shovel assembly according to an embodiment of the disclosure.
Figure 2:
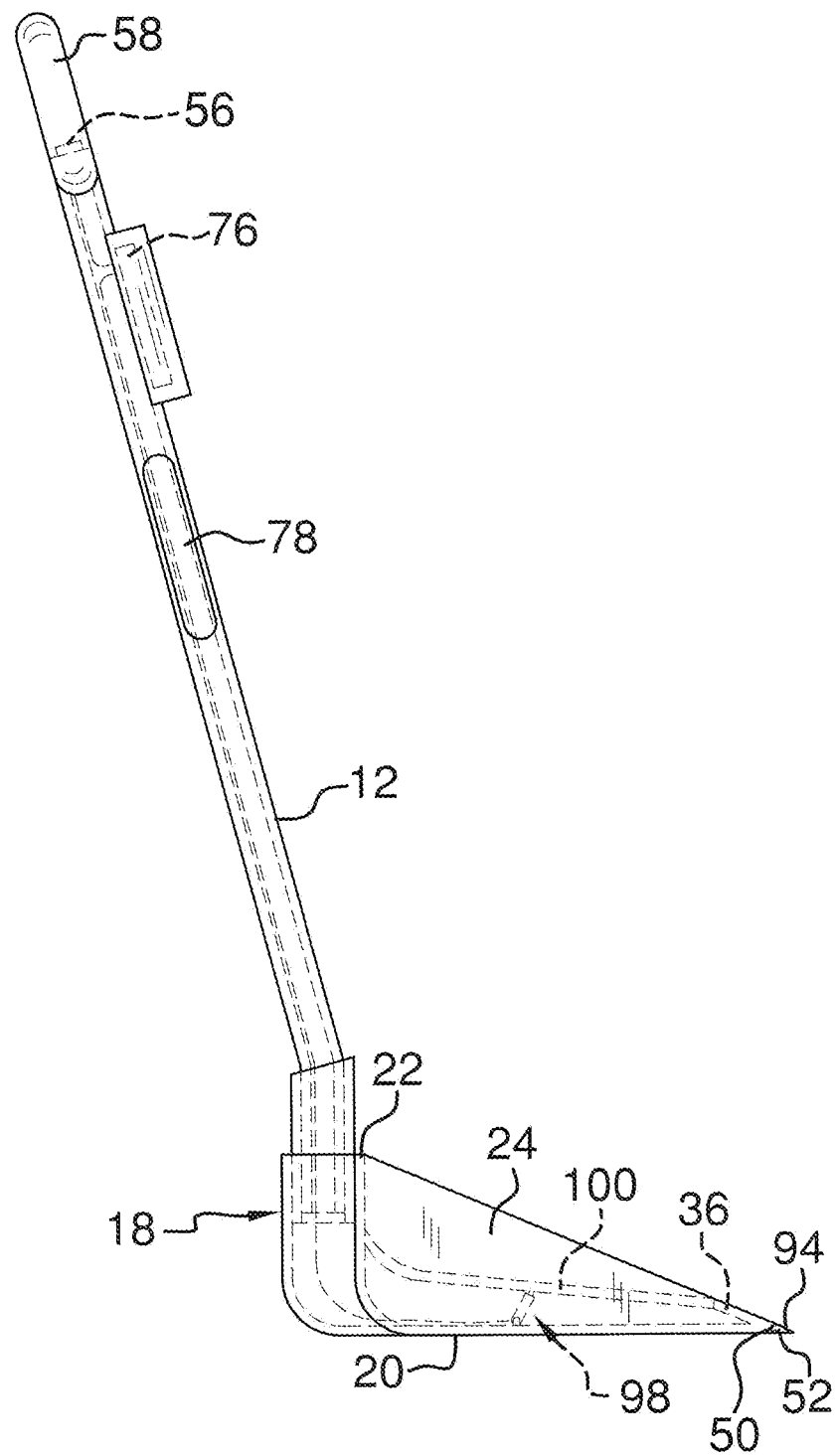
FIG. 2 is a side view of an embodiment of the disclosure.
Figure 3:
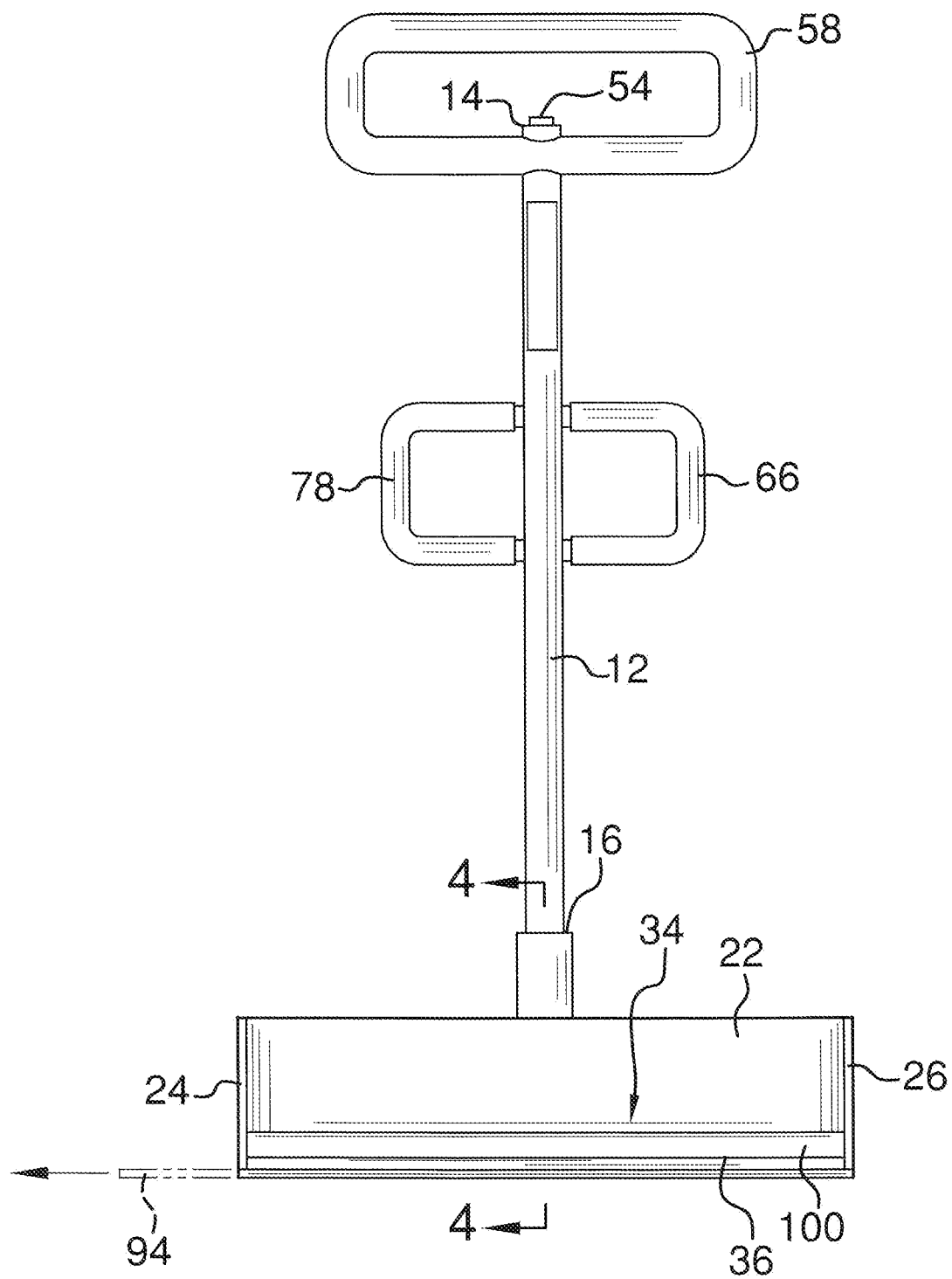
FIG. 3 is a front view of an embodiment of the disclosure.
Figure 4:
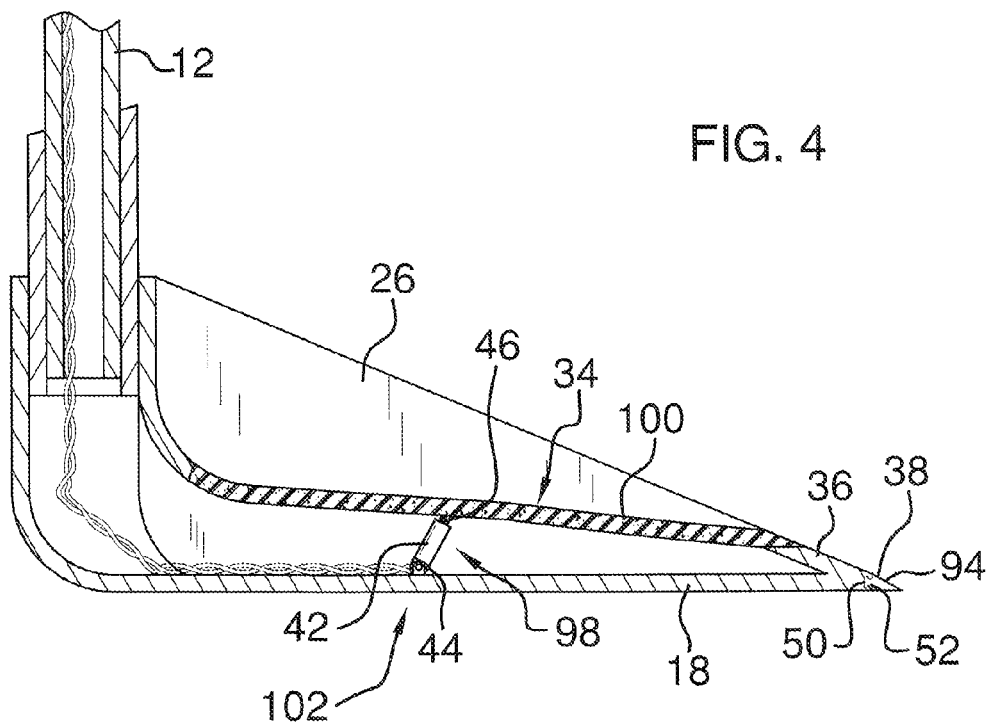
FIG. 4 is a cross-sectional view of an embodiment of the disclosure taken along line 4-4 of FIG. 3.
Figure 5:
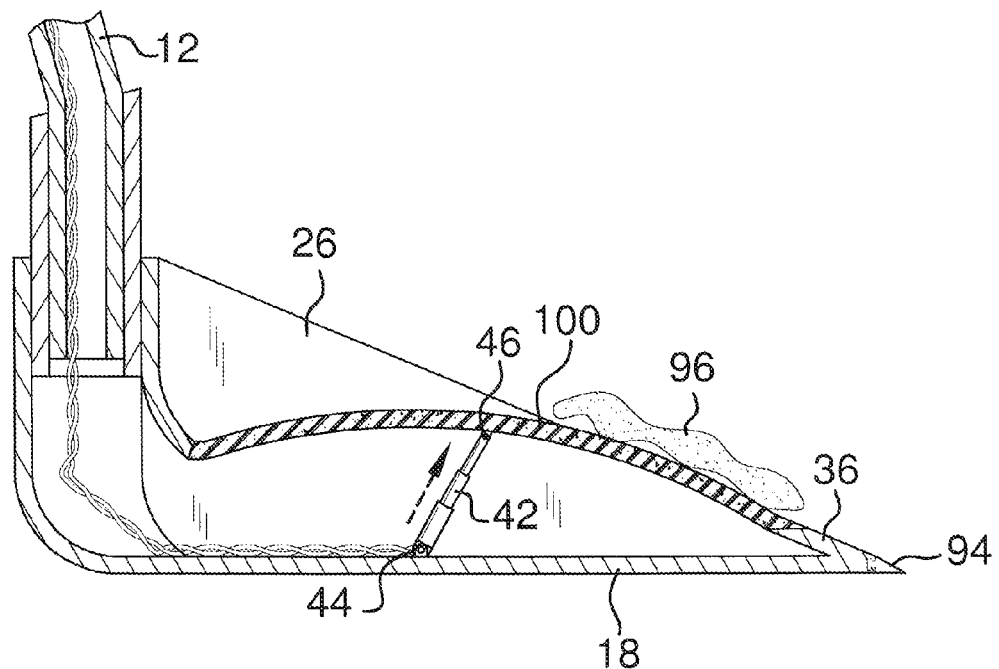
FIG. 5 is a cross-sectional view of an embodiment of the disclosure similar to FIG. 4 but in a dispensing position.

With reference now to the drawings, and in particular to FIGS. 1 through 5 thereof, a new shovel device embodying the principles and concepts of an embodiment of the disclosure and generally designated by the reference numeral 10 will be described.

As best illustrated in FIGS. 1 through 5, the hand shovel assembly 10 generally comprises a shaft 12 having an upper end 14 and a lower end 16. The shaft 12 may be collapsible to facilitate transport and storage. A pan 18 is coupled to the lower end 16 of the shaft 12. The pan 18 has a bottom wall 20, a back wall 22 which extends upwardly from the bottom wall 20, and a pair of side walls 24,26 which are coupled to and extend forwardly from opposite ends 28,30 of the back wall 22 defining an interior space 32 of the pan 18. The bottom wall 20 is substantially perpendicular to the back wall 22 of the pan 18. A height of each side wall 24,26 tapers while extending away from the back wall 22. An upper wall 34 is coupled to the pan 18 over the bottom wall 20. The upper wall 34 comprises a flexible diaphragm 100 coupled to the back wall 22 and the side walls 24,26. The upper wall 34 has a stationary front section 36 extending rearwardly from a front edge 38 of the bottom wall 20 to a front edge 40 of the flexible diaphragm 100.

A motivator 98 is coupled to the pan 18 between the bottom wall 20 and the upper wall 34. The motivator 98 selectively urges the upper wall 34 away from the bottom wall 20 wherein the upper wall 34 is configured to urge material 96 in the interior space 32 of the pan 18 out of the interior space 32. The motivator 98 may be a piston 42 having a bottom end 44 coupled to the bottom wall 20 and a top end 46 coupled to the upper wall 34.

A blade 94 is coupled to a front edge 38 of the bottom wall 20. A groove 50 extends along the front edge 38 of the bottom wall 20. A tongue 52 extends from the blade 94 wherein the blade 94 is removably coupled to the front edge 38 of the bottom wall 20 by sliding the tongue 52 into the groove 50.

An actuator 54 is coupled to the shaft 12. The actuator 54 is operationally coupled to the motivator 98 wherein manipulation of the actuator 54 activates the motivator 98. The actuator 54 is a button 56 coupled to the upper end 14 of the shaft 12. An upper handle 58 is coupled to the shaft 12 proximate the upper end 14 of the shaft 12. The upper handle 58 extends upwardly from the shaft 12 forming a loop 60 which extends from the upper end 14 of the shaft 12. An auxiliary handle 62 is coupled to a medial portion 64 of the shaft 12. The auxiliary handle 62 has a first section 78 and a second section 66. The first section 78 and the second section 66 extend from opposite sides 68,70 of the shaft 12. The auxiliary handle 62 forms a pair of aligned loops 72,74 extending from opposite sides 68,70 of the shaft 12. The auxiliary handle 62 is coplanar with the upper handle 58. A battery 76 is electrically coupled to the motivator 98 and the actuator 54. The battery 76 is rechargeable.

In use, the assembly 10 can be operated in an electrical mode utilizing the actuator 54, in a manual mode wherein the user can kick a non-skid surface 102 beneath the motivator 98, or the user may manipulate the pan 18 by grasping the upper handle 58 and the auxiliary handle 62. In all modes, the pan 18 is manipulated to urge material 96 into the pan 18. The actuator 54 is manipulated to activate the piston 42 raising the upper wall 34, and particularly the flexible diaphragm 100, to eject the material 96 from the pan 18 when desired.

With respect to the above description then, it is to be realized that the Optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A hand shovel assembly comprising:
   a shaft having an upper end and a lower end;
   a pan coupled to said lower end of said shaft, said pan having a bottom wall, a back wall extending upwardly from said bottom wall and a pair of side walls coupled to and extending forwardly from opposite ends of said back wall defining an interior space of said pan;
   an upper wall coupled to said pan over said bottom wall; and
   a motivator coupled to said pan between said bottom wall and said upper wall, said motivator selectively urging said upper wall away from said bottom wall wherein said upper wall is configured to urge material in said interior space of said pan out of said interior space, said motivator being a piston having a bottom end coupled to said bottom wall and a top end coupled to said upper wall.

2. The assembly of claim 1, wherein a height of each said side wall tapers extending away from said back wall.

3. The assembly of claim 1, further comprising a blade coupled to a front edge of said bottom wall.

4. The assembly of claim 3, further comprising:
   a groove extending along said front edge of said bottom wall; and
   a tongue extending from said blade wherein said blade is removably coupled to said front edge of said bottom wall by sliding said tongue into said groove.

5. The assembly of claim 1, further comprising an upper handle coupled to said shaft proximate said upper end of said shaft.

6. The assembly of claim 5, further comprising said upper handle extending upwardly from said shaft forming a loop extending from said upper end of said shaft.

7. The assembly of claim 5, further comprising an auxiliary handle coupled to a medial portion of said shaft.

8. The assembly of claim 7, further comprising said auxiliary handle having a first section and a second section, said first section and said second section extending from opposite sides of said shaft.

9. The assembly of claim 7, further comprising said auxiliary handle forming a pair of aligned loops extending from opposite sides of said shaft.

10. The assembly of claim 9, further comprising said auxiliary handle being coplanar with said upper handle.

11. The assembly of claim 1, further comprising an actuator coupled to said shaft, said actuator being operationally coupled to said motivator wherein manipulation of said actuator activates said motivator.

12. The assembly of claim 11, further comprising said actuator being a button coupled to said upper end of said shaft.

13. The assembly of claim 11, further comprising a battery electrically coupled to said motivator and said actuator.

14. The assembly of claim 13, further comprising said battery being rechargeable.

15. The assembly of claim 1, further comprising said bottom wall being substantially perpendicular to said back wall of said pan.

16. The assembly of claim 1, further comprising said upper wall comprising a flexible diaphragm coupled to said back wall and said side walls.

17. The assembly of claim 16, further comprising said upper wall having a stationary front section extending rearwardly from a front edge of said bottom wall to a front edge of said flexible diaphragm.

18. A hand shovel assembly comprising:
    a shaft having an upper end and a lower end;
    a pan coupled to said lower end of said shaft, said pan having a bottom wall, a back wall extending upwardly from said bottom wall and a pair of side walls coupled to and extending forwardly from opposite ends of said back wall defining an interior space of said pan, said bottom wall being substantially perpendicular to said back wall of said pan, a height of each said side wall tapering extending away from said back wall;
    an upper wall coupled to said pan over said bottom wall, said upper wall comprising a flexible diaphragm coupled to said back wall and said side walls, said upper wall having a stationary front section extending rearwardly from a front edge of said bottom wall to a front edge of said flexible diaphragm;
    a motivator coupled to said pan between said bottom wall and said upper wall, said motivator selectively urging said upper wall away from said bottom wall wherein said upper wall is configured to urge material in said interior space of said pan out of said interior space, said motivator being a piston having a bottom end coupled to said bottom wall and a top end coupled to said upper wall;
    a blade coupled to a front edge of said bottom wall;
    a groove extending along said front edge of said bottom wall;
    a tongue extending from said blade wherein said blade is removably coupled to said front edge of said bottom wall by sliding said tongue into said groove;
    an actuator coupled to said shaft, said actuator being operationally coupled to said motivator wherein manipulation of said actuator activates said motivator, said actuator being a button coupled to said upper end of said shaft;
    an upper handle coupled to said shaft proximate said upper end of said shaft, said upper handle extending upwardly from said shaft forming a loop extending from said upper end of said shaft;
    an auxiliary handle coupled to a medial portion of said shaft, said auxiliary handle having a first section and a second section, said first section and said second section extending from opposite sides of said shaft, said auxiliary handle forming a pair of aligned loops extending from opposite sides of said shaft, said auxiliary handle being coplanar with said upper handle; and
    a battery electrically coupled to said motivator and said actuator, said battery being rechargeable.

19. A hand shovel assembly comprising:
    a shaft having an upper end and a lower end;
    a pan coupled to said lower end of said shaft, said pan having a bottom wall, a back wall extending upwardly from said bottom wall and a pair of side walls coupled to and extending forwardly from opposite ends of said back wall defining an interior space of said pan;
    an upper wall coupled to said pan over said bottom wall, said upper wall comprising a flexible diaphragm coupled to said back wall and said side walls; and
    a motivator coupled to said pan between said bottom wall and said upper wall, said motivator selectively urging said upper wall away from said bottom wall wherein said upper wall is configured to urge material in said interior space of said pan out of said interior space.

20. The assembly of claim 19, further comprising said upper wall having a stationary front section extending rearwardly from a front edge of said bottom wall to a front edge of said flexible diaphragm.

* * * * *